United States Patent [19]

Suzuki

[11] Patent Number: 5,386,304
[45] Date of Patent: Jan. 31, 1995

[54] QUANTIZING CIRCUIT

[75] Inventor: Kiyosuke Suzuki, Saitama, Japan

[73] Assignee: Sony Corporation, Tokyo, Japan

[21] Appl. No.: 90,925

[22] Filed: Jul. 14, 1993

[30] Foreign Application Priority Data

Jul. 17, 1992 [JP] Japan ................................. 4-213585

[51] Int. Cl.⁶ .............................................. H04N 1/40
[52] U.S. Cl. ..................... 358/458; 358/448; 358/455; 382/50
[58] Field of Search ............... 358/406, 443, 448, 455, 358/458, 474, 487, 504, 505, 506, 519, 521, 530; 382/50, 52

[56] References Cited

U.S. PATENT DOCUMENTS

| 5,148,289 | 9/1992 | Nishiyama et al. | 358/521 |
| 5,210,600 | 5/1993 | Hirata | 358/406 |
| 5,315,408 | 5/1994 | Kawahara et al. | 358/455 |

Primary Examiner—Edward L. Coles, Sr.
Assistant Examiner—Thomas D. Lee
Attorney, Agent, or Firm—William S. Frommer; Alvin Sinderbrand

[57] ABSTRACT

A quantizing circuit is applied to a film scanner which is adapted to read image data from a negative or positive film, and the resultant film scanner is simple in arrangement, and is advantageous in that deterioration in picture quality of the output image can be prevented, and the adjustment operation for gamma correction can be simplified. In such a quantizing circuit, an analog-to-digital conversion circuit converts an input signal into a first digital signal D1 having a predetermined first bit length, and a digital signal processing circuit converts the first digital signal into a second digital signal whose bit length is smaller in the number of bits than the first bit length. In this case, the first digital signal is converted into the second digital signal based on detected maximum, minimum and average values of the second digital signal during a preview scan.

3 Claims, 3 Drawing Sheets

QUANTIZING CIRCUIT

BACKGROUND OF THE INVENTION

1. Field of the Invention

This invention relates to a quantizing circuit, and more particularly is applicable to a film scanner adapted to read image data from a negative or positive photographic film or the like.

2. Description of the Related Art

In an example of a conventional image data processing apparatus, a film scanner is used to read image data from a negative or positive photographic film (hereinafter referred to merely as "a negative or positive film", when applicable), and the image data thus read are processed as required.

That is, in a film scanner of this type, a one-dimensional image sensor is employed to pick up the image from a negative or positive film, and the resultant image pickup signal is converted into image data.

In this operation, the film changes in tone and in gamma characteristic as a whole depending on the image pickup conditions and the developing conditions. Therefore, in the image scanner, the image pickup signal is gamma-corrected using a non-linear amplifier circuit, and then is converted into image data.

In the case of a negative film, the gamma characteristic is on the order of 0.6. Therefore, as shown in FIG. 1, the contrast is expressed with a relatively small variation.

According to one method of representing a gradation of an image, $\gamma$ is expressed as a tangent of an angle between an axis representing an amount of exposure and the slope of a characteristic curve as shown in FIG. 1, and can be represented as follows:

$$G(\gamma) = \tan \theta \tag{1}$$

That is, if, in photographing a film, the exposure value is optimum, then the brightness (or density) of the film appears relatively low; whereas, if there is over-exposure, then the brightness of the film as a whole is relatively high, so that the image on the film appears to be "floating".

On the other hand, in forming a print from the film, a large difference in density cannot be properly expressed. Therefore, the density of the whole film is adjusted so that the dark and bright portions selected or desired by the camera operator appear on the print without change and that the resultant image is natural. Thus, in forming a print from a negative film, part of a wide range of densities is selectively used.

On the other hand, in the case of a film scanner, in order to adjust the gamma of the image pickup signal using a non-linear amplifier circuit, the operator performs a data setting operation; that is, he determines the part of the large range of densities which is to be selected, and selects a corresponding gamma value.

As a result, with an image processing apparatus of this type, even when a processed image is printed, the resultant print is natural in picture quality.

The above-described data setting operation is rather inconvenient, because the operator must perform the operation while watching the film.

SUMMARY OF THE INVENTION

In view of the foregoing, an object of this invention is to provide a quantizing circuit which provides a simple arrangement to prevent the output image from deteriorating in picture quality, and to simplify an adjusting operation for gamma correction.

According to the first aspect of this invention, the foregoing object and other objects of this invention have been achieved by the provision of a quantizing circuit which comprises: an analog-to-digital conversion circuit which converts an input signal into a first digital signal having a first bit length (16 bits); a digital signal processing circuit which converts, the first digital signal, according to the result of a predetermined level detection, into a second digital signal having a second bit length (8 bits) smaller in the number of bits than the first bit length (16 bits); and level detecting circuits which detect the maximum value, the minimum value and the average value of the second digital signal, and apply the result of the level detection to the digital signal processing circuit.

According to the second aspect of this invention, a quantizing circuit is provided wherein the digital signal processing circuit converts the first digital signal, according to the result of a level detection into the second digital signal so that the minimum value and the maximum value of the input signal are converted into the minimum value and the maximum value of a digital value expressed with the second bit length (8 bits), and converts the first digital signal into the second digital signal so that the average value of the second digital signal has a predetermined reference level.

According to the third aspect of this invention, a quantizing circuit is applied in a film scanner, in which an image pickup signal outputted by a predetermined image pickup means is supplied, as the input signal, to the analog-to-digital conversion circuit, and the second digital signal is supplied to predetermined signal processing circuits.

In the quantizing circuit of the present invention, the input signal is converted into the first digital signal having the first bit length (16 bits), and the latter is converted into the second digital signal whose bit length is smaller in the number of bits than the first bit length. In this case, the first digital signal based on the maximum value, the minimum value and the average value of the second digital signal is converted into the second digital signal. Therefore, with the input and output characteristics being corrected, the input signal can be converted into the second digital signal.

Further in the quantizing circuit of the present invention, the first digital signal is converted into the second digital signal so that the minimum value and the maximum value of the input signal are converted into the minimum value and the maximum value of a digital value expressed with the second bit length (8 bits), and the average value of the second digital signal has a predetermined reference level. Thus, the input and output characteristics can be set as desired.

The quantizing circuit can be applied to a film scanner adapted to process an image pickup signal. The resultant film scanner is simple in arrangement, being advantageous in that the deterioration in picture quality of the output image is prevented, and the adjusting operation for gamma correction is simplified.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 2:
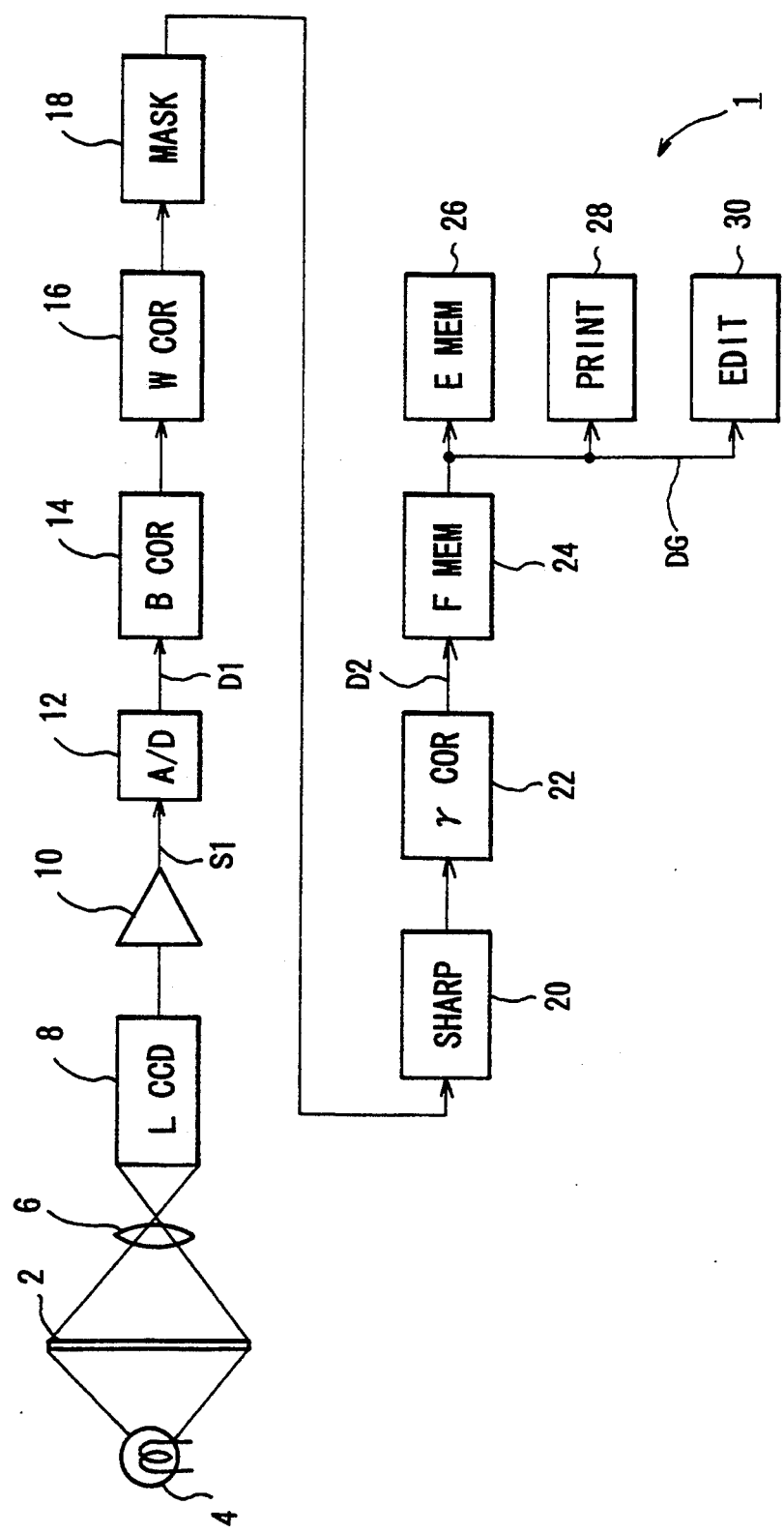
FIG. 2 is a block diagram showing a film scanner, which constitutes one embodiment of this invention.

Preferred embodiments of this invention will now be described with reference to the accompanying drawings:

In FIG. 2, reference numeral 1 generally designates a film scanner, which picks up a negative or positive image, to form image data DG.

In the film scanner 1, a film 2 is placed on a predetermined stage, and the output light beam of a light source 4 is applied to the film 2 from behind.

Under this condition, the image of the film 2 is picked up by a line CCD 8 comprising a one-dimensional color image sensor with the aid of a predetermined optical system 6. The output signal of the line CCD 8 is amplified by an amplifier circuit 10, and is applied to an analog-to-digital (A/D) converting circuit 12.

As a result, in the film scanner 1, a color signal S1 representing the image from film 2 is formed. The color signal S1 is applied to an analog-to-digital converter circuit (A/D) 12, where it is converted into a 16-bit digital signal D1, which is applied to a black correcting circuit 14.

In the black correcting circuit 14, the dark current level of the line CCD 8, which has been detected, is subtracted from the digital color signal D1, so that the black level of the signal D1 is corrected. The output of the black correcting circuit 14 is applied to a white correcting circuit 16.

In the white correcting circuit 16, the signal level of the line CCD 8, which has been detected, is utilized to correct the signal level of the digital color signal D1, in order to correct the shading of the digital color signal D1. The output signal of the white correcting circuit 16 is applied to a masking circuit 18.

In the masking circuit 18, color purity correction is performed on the output signal of the white correcting circuit 16, and the output signal of the masking circuit 18 is applied to a sharpness circuit 20, where contour emphasis is performed with respect to the output signal of the masking circuit 18.

The output signal of the sharpness circuit 20 is applied to a gamma correcting circuit 22, where the signal level of the digital color signal D1 is detected, and, using the result of the detection as a reference signal, the 16-bit digital color signal D1 is converted into an 8-bit digital color signal D2, which is applied to a frame memory circuit 24. In this operation, the digital color signal D2 is subjected to non-linear quantization when necessary, so that gamma-correction is performed.

The frame memory circuit 24 stores the digital color signal D2 supplied from the gamma correcting circuit 22. The film scanner 1 applies image data DG stored in the frame memory circuit 24 to an external memory 26, a printer 28, and an editor 30.

As a result, in the film scanner 1, the image from the film 2 is stored as the image data DG. The image thus stored can be printed out when necessary, or can be combined with a desired image by using the editor 30.

Operation of the film scanner according to this embodiment will now be described with reference to FIGS. 2 and 3.

Figure 1:
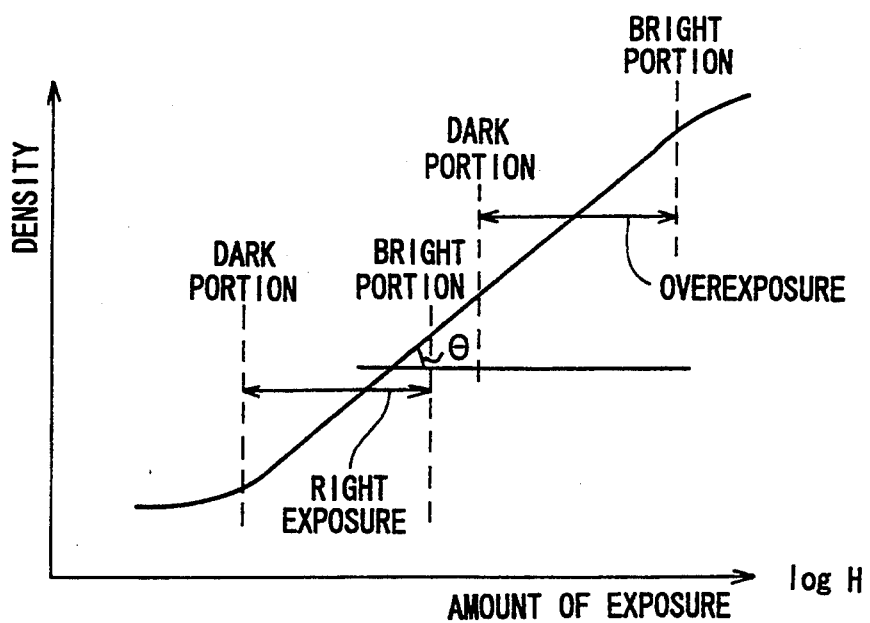
FIG. 1 is a characteristic curve used in explaining the characteristics of a negative photographic film.
Figure 3:
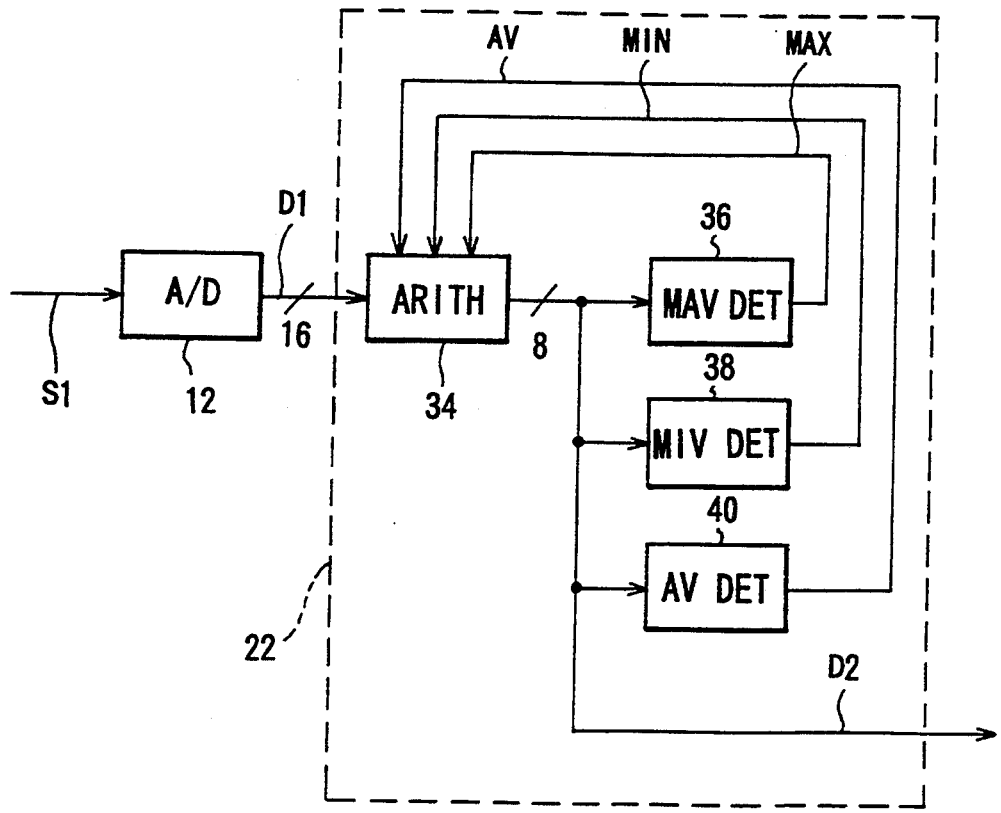
FIG. 3 is a block diagram showing a gamma correcting circuit in the film scanner of FIG. 2.

Note that, in FIG. 3, a black correcting circuit 14, and other circuits shown in FIG. 2 between an analog/digital converting circuit 12 and a gamma correcting circuit 22, are omitted.

In this embodiment, a preview scan is performed before actually picking up the image, and a characteristic of the gamma correcting circuit is controlled on the basis of the result of the preview scan.

That is, a 16-bit digital color signal obtained by preview scanning is converted into a 8-bit digital color signal in the arithmetic circuit 34 of FIG. 3, and this signal is applied to a maximum value detecting circuit 36, a minimum value detecting circuit 38 and an average value detecting circuit 40. In addition, during this preview scan, a characteristic for γ correction in the arithmetic circuit 34 is set as a characteristic of L1 shown in FIG. 4.

As a result, for example, a maximum value MAX, a minimum value MIN and a average value AV for one screen, which are obtained from the maximum value detecting circuit 36, the minimum value detecting circuit 38 and the average value detecting circuit 40, are applied to the arithmetic circuit 34.

Note that, the maximum value MAX, the minimum value MIN and the average value AV can be obtained from any portion of the screen, rather than the entire screen.

In the arithmetic circuit 34, the brightest and darkest parts of the film 2 are allotted respectively to LSB and MSB 8-bit digital color signals on the basis of the maximum value MAX, the minimum value MIN and the average value AV, so that an output characteristic for γ correction is adjusted.

Figure 4:
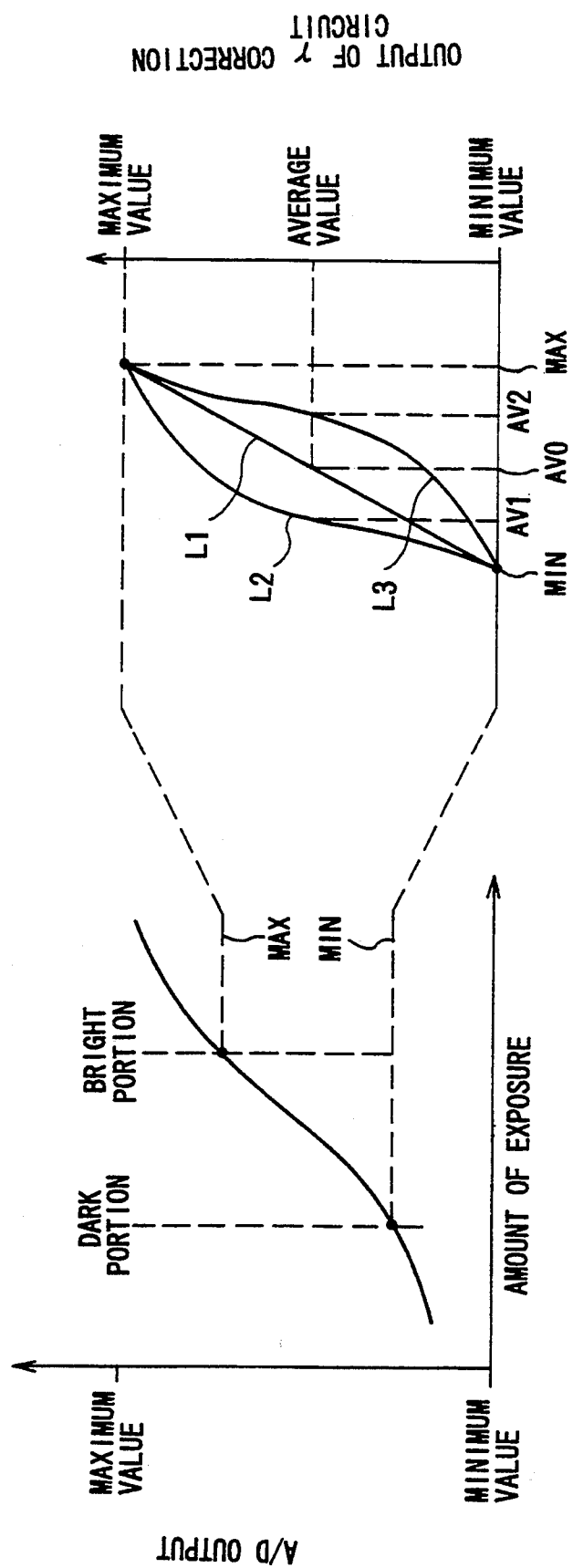
FIG. 4 is a characteristic curve used in explaining the gamma correcting circuit of FIG. 3.

That is, as seen in FIG. 4, in the low exposure region (dark portion) of the γ curve, the curve is formed as a lower convex curve, and to correct this, an output characteristic for the γ correcting circuit is formed as character curve L2.

Thus, if the average value AV is small (AV1), the output characteristic for the γ correcting circuit is selected to be L2.

If the amount of exposure is large, the γ curve (corresponding to the bright portion) is formed as an upper convex curve, and to correct this, an output of the γ correcting circuit is corrected according to the characteristic curve L3.

That is, if the average value AV is large (AV2), an output characteristic for the γ correcting circuit is selected to be L3.

If the amount of exposure is at an average level (AV0), an output characteristic of the γ correcting circuit is corrected according to the characteristic curve L1.

Thereafter, a 16-bit digital color signal D1, obtained by the next scanning operation, is converted into a 8-bit digital color signal D2 in the γ correcting circuit 22, according to a state set based on the preview scanning.

Some films are relatively dark as a whole because of the failure of the flash lamp, for instance that is, the image appears as if it sank into darkness; and some films are relatively bright, like those which are obtained when a scene is photographed in summer sunlight; that is, the image appears as if floating in brightness.

Therefore, the film scanner 1 operates as follows: The average brightness of the film 2 is detected, so as to detect the characteristics of the film 2. Then the digital color signal D1 is converted into the digital color signal D2 so that the average value becomes the central value of 8-bit digital values.

In the case where the image is dark, the average brightness of the film 2 is detected to be small, i.e., AV1. Therefore, the arithmetic circuit 34 converts the digital color signal D1 into the digital color signal D2 so that the bright portion is compressed as indicated by the curve L2 in FIG. 4.

On the other hand, in the case where the image is bright over all, the average brightness of the film 2 is detected to be large, i.e., AV2. Therefore, the arithmetic circuit 34 converts the digital color signal D1 into the digital color signal D2 so that the dark portion is compressed as indicated by the curve L3 in FIG. 4.

Thus, in the film scanner 1, the input and output characteristics of the gamma correcting circuit 22 are automatically set, and in the next scanning operation the image data DG are stored in the frame memory circuit 24.

Accordingly, in the film scanner 1, of the present invention the input and output characteristics of the gamma correcting circuit 22 are automatically corrected, and no manual adjustment operation for gamma correction is necessary.

In this case, in the film scanner 1 as described, after the formation of the 16-bit digital color signal D1 the maximum value and the minimum value are established, and the digital color signal D1 is converted into the 8-bit digital color signal D2. Hence, the film 2 can be expressed with 8-bit digital values in its entirety from the dark portion to the bright portion, and the deterioration in picture quality of the output image is largely prevented.

If, before the non-linear quantization is carried out in the above-described manner, black correction and white correction are performed prior to the conversion of the 16-bit digital color signal, then the deterioration in picture quality, which otherwise may be caused in the image correction of this type, can be minimized.

The above-described image processing operation can be carried out by using 16-bit data. In this case, the deterioration in picture quality can be prevented similarly as in the above-described case. However, the method is disadvantageous in that if the image processing operation goes forward with the 16-bit data stored in the frame memory circuit 24 without conversion, then the signal processing circuits in the latter stages such as the frame memory circuit 24 etc. must be modified so as to have a complicated arrangement.

Thus, with the embodiment described above, deterioration in picture quality can be effectively prevented, and the signal processing circuits in the latter stage can be simple in arrangement.

In the above-described embodiment, the color signal S1 is converted into the 16-bit digital color signal D1, and then the signal D1 is converted into the 8-bit digital color signal by the arithmetic circuit. In this operation, based on the maximum, minimum and average values of the digital color signal D2, the digital color signal D1 is converted into the digital color signal D2. As a result, in accordance with the image on the film 2, the input and output characteristics of the arithmetic circuit can be changed as desired, and the film scanner can be simplified in arrangement, with the advantage that deterioration in picture quality of the output image can be prevented, and the adjustment for gamma correction can be simplified.

In the above embodiment, the color signal S1 is converted into the 16-bit digital color signal D1, and then the signal D1 is converted into the 8-bit digital color signal; however, this invention is not limited to these bit lengths. That is, the bit lengths can be changed as required.

Furthermore, in the above embodiment, the color signal is utilized to process the image as picked up; however, it should be noted that this invention is not limited in this regard. That is, for instance, a luminance signal or color difference signal may be used for the same purpose.

Moreover, in the above embodiment, the line CCD is used to pick up the image from a film; however, this invention is not limited in this regard. That is, the line CCD may be replaced, for instance, by a two-dimensional solid image pick-up element.

In addition, in the above embodiment, the digital color signal D1 is converted into the digital color signal D2 so that the average value is the central value of 8-bit digital values; however, this invention is not limited in this regard. That is, the conversion may be made so that the average value is a selected one of a variety of reference levels as the case may be.

In the above embodiment, the technical concept of the invention is applied to a film scanner; however, this invention is not limited in this regard. That is, the technical concept of the invention may be generally applied to the case where an image is obtained from a picture or the like, and the case where a process is carried out with an input signal converted into a digital signal.

Furthermore, in the above embodiment, the characteristic for correcting the output of the $\gamma$ correcting circuit is adjusted based on the digital color signal D1 obtained while preview scanning; however, in film scanning, since the same pictures are often printed in succession, $\gamma$ conversion according to this invention may be performed by using the correcting characteristic for the preceding output, and may be changed to the correct value for each image pick-up.

Further, in the above embodiment, the maximum value, the minimum value and the average value are obtained from the output signal of the arithmetic circuit 34; however, this invention is not limited in this regard, and the maximum, minimum and average value may be obtained from the input signal S1 for the digital color signal D1.

While the preferred embodiments of the invention have been described, it will be obvious to those skilled in the art that various changes and modifications may be made therein and it is intended, therefore, to cover in the appended claims all such changes and modifications as fall within the true spirit and scope of the invention.

What is claimed is:

1. An image scanning apparatus, comprising:
   an image sensor operative to scan an object for generating an analog image signal representative of an image density of the object;
   converting means connected to said image sensor for converting said analog image signal into a first digital image signal having a first gradation;
   processing means connected to said converting means for processing said first digital image signal to provide a second digital image signal which has a second gradation that is less than said first gradation, said processing means operating during a first scan of said image sensor to form said second digital image signal by applying a linear function to said first digital image signal;

means for detecting a maximum level of said second digital image signal obtained during the first scan of said image sensor;

means for detecting a minimum level of said second digital image signal obtained during the first scan of said image sensor; and means for detecting an average level of said second digital image signal obtained during the first scan of said image sensor;

said processing means operating during a second scan of said image sensor to form said second digital image signal by applying a nonlinear function to said first digital image signal such that a maximum value of said second digital image signal obtained during the second scan of said image sensor is determined in accordance with the maximum level of said second digital image signal obtained during the first scan, a minimum value of said second digital image signal obtained during the second scan of said image sensor is determined in accordance with the minimum level of said second digital image signal obtained during the first scan, and a nonlinear characteristic of said nonlinear function applied to said first digital image signal is determined in accordance with the average level of said second digital image signal obtained during the first scan.

2. An image scanning apparatus, comprising:

an image sensor operative to scan an object for generating an analog image signal representative of an image density of the object;

converting means connected to said image sensor for converting said analog image signal into a first digital image signal having a first gradation;

means for detecting a maximum level of said first digital image signal obtained during a first scan of said image sensor;

means for detecting a minimum level of said first digital image signal obtained during the first scan of said image sensor;

means for detecting an average level of said first digital image signal obtained during the first scan of said image sensor; and processing means connected to said converting means for processing said first digital image signal to provide a second digital image signal which has a second gradation that is less than said first gradation, said processing means operating during a second scan of said image sensor to form said second digital image signal by applying a nonlinear function to said first digital image signal such that a maximum value of said second digital image signal obtained during the second scan of said image sensor is determined in accordance with the maximum level of said first digital image signal obtained during the first scan, a minimum value of said second digital image signal obtained during the second scan of said image sensor is determined in accordance with the minimum level of said first digital image signal obtained during the first scan, and a nonlinear characteristic of said nonlinear function applied to said first digital image signal is determined in accordance with the average level of said first digital image signal obtained during the first scan.

3. An image scanning apparatus, comprising:

an image sensor operative to scan an object for generating an analog image signal representative of an image density of the object;

means for detecting a maximum level of said analog image signal obtained during a first scan of said image sensor;

means for detecting a minimum level of said analog image signal obtained during the first scan of said image sensor;

means for detecting an average level of said analog image signal obtained during the first scan of said image sensor;

converting means connected to said image sensor for converting said analog image signal into a first digital image signal having a first gradation; and processing means connected to said converting means for processing said first digital image signal to provide a second digital image signal which has a second gradation that is less than said first gradation, said processing means operating during a second scan of said image sensor to form said second digital image signal by applying a nonlinear function to said first digital image signal such that a maximum value of said second digital image signal obtained during the second scan of said image sensor is determined in accordance with the maximum level of said analog image signal obtained during said first scan of said image sensor, a minimum value of said second digital image signal obtained during the second scan of said image sensor is determined in accordance with the minimum level of said analog image signal obtained during said first scan of said image sensor, and a nonlinear characteristic of said nonlinear function applied to said first digital image signal is determined in accordance with the average level of said analog image signal obtained during said first scan of said image sensor.

* * * * *